US 12,017,760 B2

(12) United States Patent
Ogasawara et al.

(10) Patent No.: US 12,017,760 B2
(45) Date of Patent: Jun. 25, 2024

(54) TRANSMISSION LUBRICATING ASSEMBLY OF HELICOPTER

(71) Applicant: KAWASAKI JUKOGYO KABUSHIKI KAISHA, Kobe (JP)

(72) Inventors: Kenta Ogasawara, Kobe (JP); Akira Hayasaka, Kobe (JP); Hiroki Yamamoto, Kobe (JP); Hidenori Arisawa, Kobe (JP); Yuji Shinoda, Kobe (JP); Mitsuaki Tanaka, Kobe (JP); Hironori Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 124 days.

(21) Appl. No.: 17/848,917

(22) Filed: Jun. 24, 2022

(65) Prior Publication Data
US 2022/0315211 A1   Oct. 6, 2022

Related U.S. Application Data

(63) Continuation of application No. PCT/JP2020/047289, filed on Dec. 17, 2020.

(30) Foreign Application Priority Data
Dec. 26, 2019   (JP) .................................. 2019-236612

(51) Int. Cl.
*F16H 57/04* (2010.01)
*B64C 27/12* (2006.01)

(52) U.S. Cl.
CPC ......... *B64C 27/12* (2013.01); *F16H 57/0423* (2013.01); *F16H 57/0424* (2013.01); *F16H 57/0457* (2013.01); *F16H 57/0493* (2013.01)

(58) Field of Classification Search
CPC ............ F16H 57/0423; F16H 57/0457; F16H 57/0493
See application file for complete search history.

(56) References Cited

U.S. PATENT DOCUMENTS

| 2,147,146 A | * | 2/1939 | Carlson | ............... F16H 57/0483 184/11.2 |
| 6,230,842 B1 | * | 5/2001 | Haeberer | ............ F16H 57/0493 184/6.12 |

(Continued)

FOREIGN PATENT DOCUMENTS

| DE | 10 2013 018 712 A1 | 5/2015 |
| JP | 2007-008461 A | 1/2007 |

(Continued)

OTHER PUBLICATIONS

Extended European Search Report dated Jan. 3, 2024, issued in European Application No. 20905329.7.

*Primary Examiner* — Minh Truong
(74) *Attorney, Agent, or Firm* — Sughrue Mion, PLLC

(57) ABSTRACT

A transmission lubricating assembly of a helicopter includes: a transmission including a speed change structure that changes the speed of rotation produced by rotational power input from a prime mover and outputs the resulting rotational power and a housing accommodating the speed change structure; and a lubricator that lubricates the speed change structure. The lubricator includes a collector that collects a mist of a lubricating oil in an internal space of the housing and a dropper that is disposed below the collector and that applies droplets of the lubricating oil to the speed change structure, the droplets resulting from the collected mist being gathered under its own weight.

10 Claims, 5 Drawing Sheets

(56) References Cited

U.S. PATENT DOCUMENTS

| | | | |
|---|---|---|---|
| 8,475,314 B2* | 7/2013 | Corless | F16H 57/0483 |
| | | | 184/6.12 |
| 2009/0071753 A1 | 3/2009 | Carnelli et al. | |
| 2010/0038174 A1* | 2/2010 | Mordukhovich | F16H 57/0483 |
| | | | 184/6.12 |
| 2010/0144480 A1* | 6/2010 | Downs | F16H 57/0483 |
| | | | 475/160 |
| 2016/0290479 A1 | 10/2016 | Wu | |
| 2017/0097086 A1* | 4/2017 | Ono | B60K 6/405 |

FOREIGN PATENT DOCUMENTS

| | | | |
|---|---|---|---|
| SU | 411256 A1 * | 1/1971 | |
| SU | 804962 A2 * | 2/1981 | |
| SU | 1486692 A2 | 6/1989 | |

* cited by examiner

TRANSMISSION LUBRICATING ASSEMBLY OF HELICOPTER

CROSS-REFERENCE TO RELATED APPLICATION

The present application is a bypass continuation of PCT Filing PCT/JP2020/047289, filed Dec. 17, 2020, which claims priority to JP 2019-236612, filed Dec. 26, 2019, both of which are incorporated by reference in their entirety.

BACKGROUND OF THE INVENTION

1. Field of the Invention

The present disclosure relates to a transmission lubricating assembly of a helicopter.

2. Description of the Related Art

For example, a transmission of a helicopter changes the speed of rotation produced by rotational power input from a prime mover and outputs the resulting rotational power. For the transmission to operate smoothly, it is common practice to supply a lubricating oil to the transmission by a lubricating system.

As disclosed in Japanese Laid-Open Patent Application Publication No. 2007-8461, the transmission of the helicopter is required to have the ability to continue operating for a certain period of time even in an abnormal situation where the lubricating oil is not supplied to the transmission externally by the lubricating system during flight (this situation may be referred to as "dry-run situation" hereinafter). In such an abnormal situation, the lack of supply of the lubricating oil to the transmission could cause insufficient lubrication and hence severe overheating of the transmission. This makes it difficult for the transmission to operate smoothly, leading to shortening of the possible flight time in the abnormal situation.

SUMMARY OF THE INVENTION

A transmission lubricating assembly of a helicopter according to one aspect of the present disclosure includes: a transmission including a speed change structure that changes the speed of rotation produced by rotational power input from a prime mover and outputs the resulting rotational power and a housing accommodating the speed change structure; and a lubricator that lubricates the speed change structure, wherein the lubricator includes a collector that collects a mist of a lubricating oil in an internal space of the housing and a dropper that is disposed below the collector and that applies droplets of the lubricating oil to the speed change structure, the droplets resulting from the collected mist being gathered under its own weight.

DESCRIPTION OF THE PREFERRED EMBODIMENTS

Hereinafter, exemplary embodiments will be described with reference to the drawings.

First Embodiment

Figure 1:
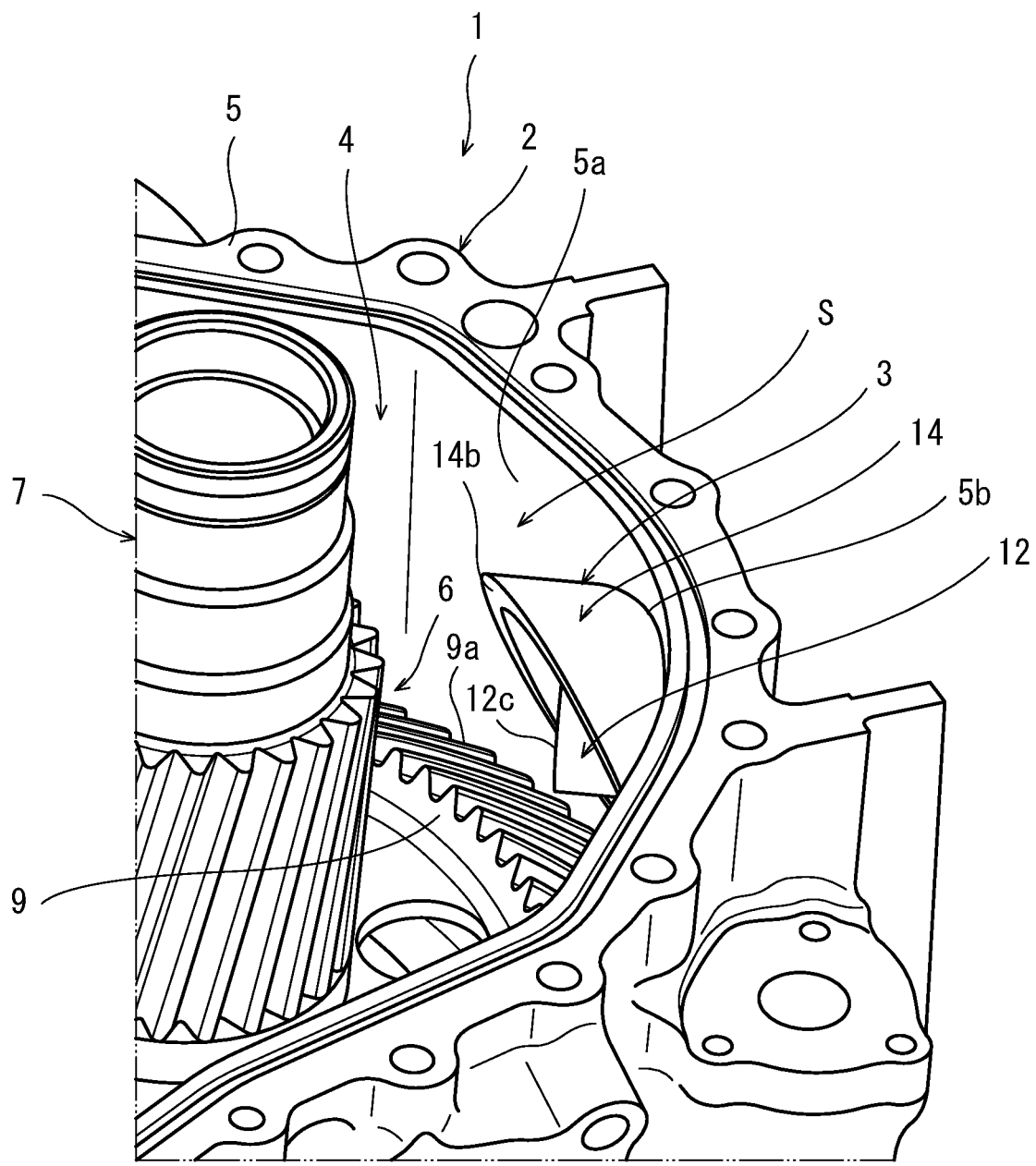
FIG. 1 is an exploded view of a transmission of a helicopter according to a first embodiment.
Figure 2:
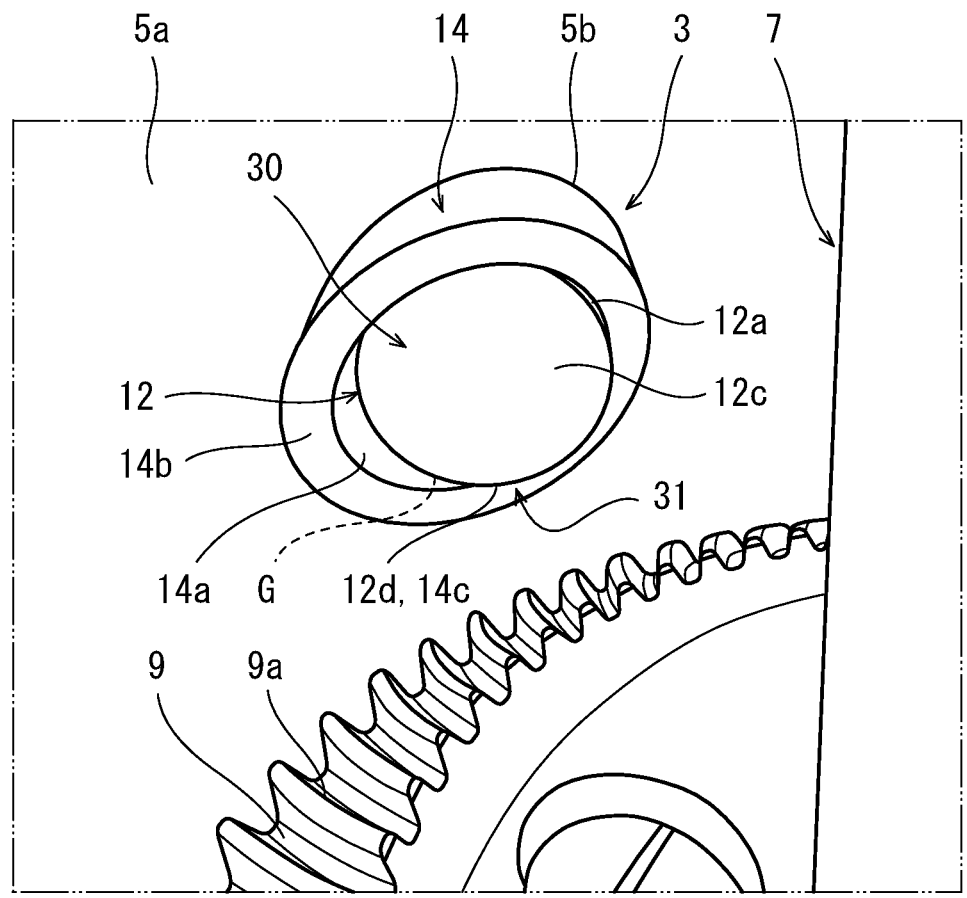
FIG. 2 is a perspective view of a lubricator of FIG. 1 as viewed from inside a housing.
Figure 3:
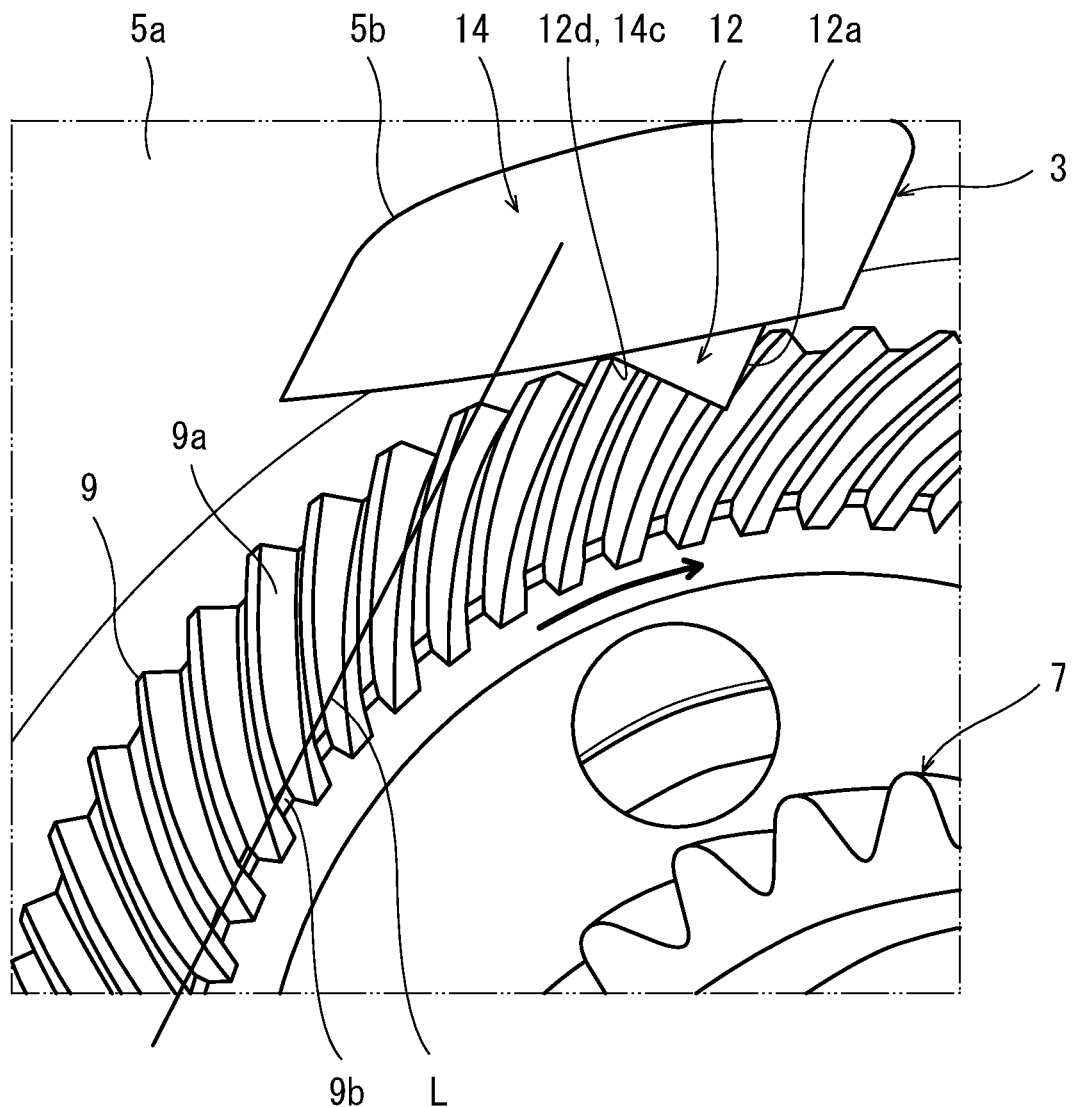
FIG. 3 is a top view of the lubricator of FIG. 1.
Figure 4:
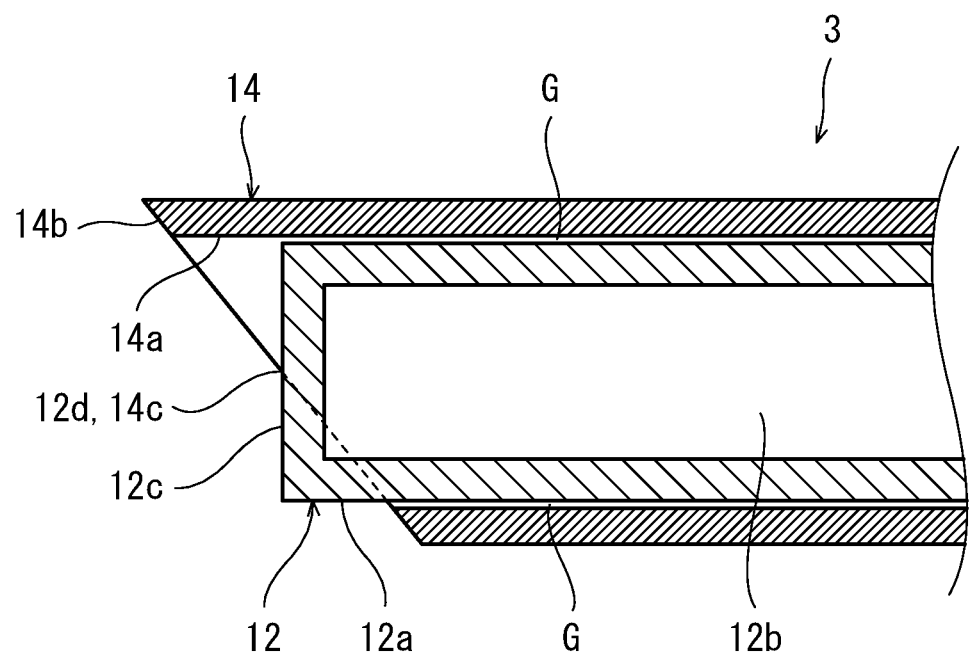
FIG. 4 is a cross-sectional view of the lubricator of FIG. 1 as viewed in the vertical direction.

FIG. 1 is an exploded view of a transmission 2 of a helicopter according to a first embodiment. FIG. 2 is a perspective view of a lubricator 3 of FIG. 1 as viewed from inside a housing 5. In FIG. 2, the internal construction of the transmission 2 is depicted with an upper structure removed from the housing 5. FIG. 3 is a top view of the lubricator 3 of FIG. 1. FIG. 4 is a cross-sectional view of the lubricator 3 of FIG. 1 as viewed in the vertical direction.

Referring to FIGS. 1 to 3, the transmission lubricating assembly 1 of the helicopter according to the first embodiment lubricates the transmission 2 when the helicopter is in the dry-run situation. The transmission lubricating assembly 1 includes the transmission 2 and the lubricator 3. The transmission 2 includes a speed change structure 4 and the housing 5. The transmission 2 is a main gear box of the helicopter. The speed change structure 4 changes the speed of rotation produced by rotational power input from a prime mover of the helicopter and outputs the resulting rotational power. The speed change structure 4 of the first embodiment changes the speed of rotation produced by rotational power input from the prime mover and outputs the resulting rotational power to a main rotor and a tail rotor of the helicopter. The transmission lubricating assembly 1 is disposed, for example, below the main rotor.

The speed change structure 4 includes gears 6 and rotating shafts 7 that are rotatably supported. The rotating shafts 7 include an input shaft that is rotated at a relatively high speed by the rotational power from the prime mover. The gears 6 are secured to the rotating shafts 7. The rotating shafts 7 are rotatably supported by bearings (e.g., ball bearings). In normal situations, the gears 6, rotating shafts 7, and bearings are lubricated with a lubricating oil supplied by a lubricating system of the helicopter and operate smoothly. The gears 6 include a bevel gear 9 disposed such that a toothed surface 9a of the bevel gear 9 faces upward. The toothed surface 9a of the bevel gear 9, which faces upward, extend longitudinally in a horizontal direction. The gears 6 of the first embodiment include two or more gears disposed such that the toothed surfaces of the gears face upward.

The housing 5 includes an internal space S. The internal space S of the first embodiment extends in the front-rear, left-right, and up-down directions. The housing 5 accommodates the speed change structure 4 in the internal space S. During operation of the transmission 2, a mist of the lubricating oil supplied from the lubricating system usually floats in the internal space S of the housing 5. The term "mist" as used herein refers, for example, to an ensemble of liquid particles having a diameter in the order of micrometers or less. The housing 5 includes an inner wall 5a surrounding the speed change structure 4.

The lubricator 3 lubricates the speed change structure 4. The lubricator 3 includes a collector 30 and a dropper 31. The collector 30 collects the lubricating oil in the internal space S of the housing 5. Specifically, the collector 30 collects the mist of the lubricating oil in the internal space S of the housing 5. The dropper 31 is disposed below the collector 30 and applies droplets of the collected lubricating oil to the speed change structure 4. Specifically, the collected mist is gathered into droplets under its own weight, and the dropper 31 applies the droplets of the lubricating oil to the speed change structure 4. The mist collected by the lubricator 3 include at least a mist scattered directly from the speed change structure 4 or a mist floating in the internal space S. Drive power for operating the lubricator 3 is not needed as the droplets of the lubricating oil fall under their own weight from the lubricator 3.

The housing 5 is constructed by a combination of different components. For example, the housing 5 includes upper and lower structures combined together in the up-down direction. The lubricator 3 is mounted on the housing 5 (on the lower structure in this embodiment).

The lubricator 3 applies the droplets of the lubricating oil to the toothed surface of at least one of the gears 6 of the speed change structure 4. The lubricator 3 of the first embodiment applies the droplets of the lubricating oil to the toothed surface 9a of the bevel gear 9. The lubricator 3 of the first embodiment is disposed at a location that allows the lubricating oil droplets falling from the lubricator 3 to lubricate at least one of the gears. The application of the lubricating oil droplets to the speed change structure 4 by the lubricator 3 reduces seizure of the speed change structure 4 in the dry-run situation. This lengthens the time taken for seizure of the speed change structure 4 to occur in the dry-run situation. The lubricator 3 is mounted on the inner wall 5a of the housing 5. For example, the lubricator 3 is mounted on the inner wall 5a of a left or right portion of the housing 5. For example, the lubricator 3 is inserted into an insertion hole 5b of the left or right portion of the housing 5 such that the lubricator 3 can be in contact with external air.

Specifically, as shown in FIGS. 2 to 4, the lubricator 3 includes a shaft structure 12 and a tubular structure 14. The shaft structure 12 is inserted in part into the tubular structure 14 such that one axial end of the shaft structure 12 (this axial end may be hereinafter referred to as the "first end" of the shaft structure 12) protrudes out of the tubular structure 14. The shaft structure 12 extends in a horizontal direction. The tubular structure 14 is disposed so as to enclose an outer peripheral surface 12a of the shaft structure 12, with a gap G defined between an inner peripheral surface 14a of the tubular structure 14 and the outer peripheral surface 12a of the shaft structure 12. In the first embodiment, the shaft structure 12 is in the shape of a circular cylinder. The tubular structure 14 is in the shape of a straight pipe. The axis of the shaft structure 12 and the axis of the tubular structure 14 coincide with each other. Thus, the gap G is ring-shaped and has a constant width when viewed in the axial direction of the shaft structure 12, and extends tubularly in the axial direction of the shaft structure 12.

In the lubricator 3 of the first embodiment, the collector 30 includes the outer peripheral surface 12a of the shaft structure 12, an end surface 12c of the first end of the shaft structure 12, and the inner peripheral surface 14a of the tubular structure 14. The dropper 31 includes a lowermost point 12d of a region of the shaft structure 12 and a lowermost point 14c of a region of the tubular structure 14, the regions facing each other across the gap G.

The collector 30 of the first embodiment is disposed such that the end surface 12c of the first end of the shaft structure 12 faces in a direction against the direction of rotation of the bevel gear 9 and along a line L that is tangent to an addendum circle 9b along the inner periphery of the bevel gear 9 and that is parallel to the axial direction of the shaft structure 12. In this embodiment, the lubricator 3 is disposed such that the axial directions of the shaft structure 12 and tubular structure 14 are parallel to the tangent line L in top view. Thus, the collector 30 is disposed so as to collect a lubricating oil mist scattered from the bevel gear 9 and a lubricating oil mist flowing in the internal space S under the effect of the rotation of the bevel gear 9.

The shaft structure 12 and the tubular structure 14 may be made of the same material or different materials. The shaft structure 12 and tubular structure 14 of the first embodiment are non-magnetic and made of a non-magnetic material such as stainless steel. Thus, the lubricator 3 can avoid adsorption of magnetic matter such as gear abrasion powder onto the shaft structure 12 and tubular structure 14 in the case where the magnetic matter is mixed in with the lubricating oil present in the housing 5. Alternatively, only one of the shaft structure 12 and tubular structure 14 may be non-magnetic. In the case where, for example, the problem of soiling with magnetic matter is not significant, at least one of the shaft structure 12 and tubular structure 14 may be non-magnetic.

The lubricator 3 is disposed such that the first end of the shaft structure 12 and one axial end of the tubular structure 14 that is located around the first end of the shaft structure 12 (the axial end of the tubular structure 14 may be hereinafter referred to as the "first end" of the tubular structure 14) are exposed to the internal space S of the housing 5. The lubricator 3 is disposed so as to slope downward from the other axial end of the shaft structure 12 to the first end of the shaft structure 12. For example, the lubricator 3 of the first embodiment is disposed such that the shaft structure 12 and tubular structure 14 slope downward from the exterior to the interior of the housing 5. The downward slope is defined such that droplets of the lubricating oil retained in the gap G fall at a suitable speed. Thus, the lubricator 3 retains the lubricating oil in the gap G and applies the droplets of the lubricating oil from the first end and its vicinity of the tubular structure 14 to the speed change structure 4.

In the first embodiment, the first end of the shaft structure 12 protrudes out of the first end of the tubular structure 14. In top view, an end surface 14b of the first end of the tubular structure 14 (the end surface located in the internal space S in this embodiment) forms an angle with the end surface 12c of the shaft structure 12. The lowermost points 12d and 14c of the shaft structure 12 and tubular structure 14 are located in a plane including the end surface 12c of the shaft structure 12. In the first embodiment, the lowermost point 12d is located at the boundary between the end surface 12c of the first end of the shaft structure 12 and the outer peripheral surface 12a of the shaft structure 12. The lowermost point 14c coincides, for example, with the lowermost point of the inner peripheral surface 14a of the tubular structure 14. For example, in top view, the end surface 12c of the first end of the shaft structure 12 is disposed perpendicular to the tangent line L and at a location where the end surface 12c can collect a lubricating oil mist scattered along the tangent line L from the bevel gear 9 which is rotating. Thus, the lubricator 3 collects the mist of the lubricating oil efficiently, and the droplets of the lubricating oil in the gap G are easily guided under their own weight along the outer peripheral surface 12a of the shaft structure 12 and the inner peripheral surface 14a of the tubular structure 14 and gathered to the lowermost points 12d and 14c.

The shaft structure 12 is shaped as a tube in which the end surface 12c located towards the first end of the tubular structure 14 is closed. Thus, the shaft structure 12 includes a hollow interior 12b extending in the axial direction. The shaft structure 12 is shaped to allow a gas to flow into the hollow interior 12b from outside the housing 5. In the shaft structure 12 of the first embodiment, the hollow interior 12b is open to external air at the other axial end of the shaft structure 12, and the external air flows into the hollow interior 12b. The gas flowing in the hollow interior 12b may be forcibly supplied into the hollow interior 12b, for example, by a blower.

In the transmission 2, a mist of the lubricating oil present in the internal space S of the housing 5 contacts the shaft structure 12 of the lubricator 3, and upon this contact the mist particles are aggregated into droplets of the lubricating oil. The droplets of the lubricating oil are temporarily retained in the gap G, then gathered to the lowermost points 12d and 14c of the shaft structure 12 and tubular structure 14, and fall under their own weight from the lowermost points 12d and 14c to the speed change structure 4.

As described in the foregoing, the transmission lubricating assembly 1 can apply droplets of a lubricating oil from the lubricator 3 to the speed change structure 4 even in the dry-run situation without using large-scale oil feed equipment including an oil tank and valves or using additional drive power. Thus, seizure of the speed change structure 4 (e.g., seizure of the gears 6) can be reduced in the dry-run situation. As such, the transmission 2 can operate smoothly, and the possible flight time can be made longer than ever before.

The lubricator 3 is mounted on the housing 5. Thus, it is relatively easy to equip the transmission 2 with the lubricator 3 using an existing construction of the transmission 2.

The speed change structure 4 includes the gears 6, and the lubricator 3 applies the droplets of the lubricating oil to the toothed surface of at least one of the gears 6. Thus, in the dry-run situation, seizure of the toothed surface of the gear 6 can be reduced to allow the transmission 2 to operate smoothly.

The gears 6 include the bevel gear 9 disposed such that the toothed surface 9a of the bevel gear 9 faces upward, and the lubricator 3 applies the droplets of the lubricating oil to the toothed surface 9a of the bevel gear 9. Thus, seizure of the toothed surface 9a of the bevel gear 9 can be reduced in the dry-run situation. As such, the transmission 2 can operate smoothly even in the case where the bevel gear 9 is used in the dry-run situation. Since the droplets of the lubricating oil are applied to the toothed surface 9a of the bevel gear 9 which is disposed such that the toothed surface 9a faces upward, the application of the droplets of the lubricating oil can be effected over a wide area of the toothed surface 9a, and seizure of the toothed surface 9a can be reliably prevented.

In the first embodiment, the collector 30 is disposed such that the end surface 12c of the shaft structure 12 and the opening of the gap G between the shaft structure 12 and the tubular structure 14 face against the direction of rotation of the bevel gear 9 when viewed in the direction of the rotation axis of the bevel gear 9. That is, the opening of the gap G, as viewed in the direction of the rotation axis of the bevel gear 9, faces in a direction opposite to the direction of rotation of the bevel gear 9. Thus, the lubricator 3 can efficiently collect a lubricating oil mist scattered from the bevel gear 9 which is rotating and a lubricating oil mist floating in the internal space S of the housing 5.

The lubricator 3 includes the shaft structure 12 extending in a horizontal direction and the tubular structure 14 disposed to enclose the outer peripheral surface 12a of the shaft structure 12, with the gap G defined between the inner peripheral surface 14a of the tubular structure 14 and the outer peripheral surface 12a of the shaft structure 12, and one axial end of the tubular structure 14 is located below the other axial end of the tubular structure 14. The collector 30 includes the outer peripheral surface 12a of the shaft structure 12, the end surface 12c of the shaft structure 12, and the inner peripheral surface 14a of the tubular structure 14, the end surface 12c of the shaft structure 12 being located towards the one axial end of the tubular structure 14. Droplets of the lubricating oil are retained in the gap G, and the dropper 31 includes the lowermost point 12d of a region of the shaft structure 12 and the lowermost point 14c of a region of the tubular structure 14, the regions facing each other across the gap G. In the above configuration, droplets of the lubricating oil are formed from the mist in the gap G between the shaft structure 12 and the tubular structure 14, and the droplets of the lubricating oil can be applied to a desired site of the speed change structure 4 from the lowermost points 12d and 14c of the shaft structure 12 and the tubular structure 14.

In the first embodiment, one axial end of the shaft structure 12 protrudes out of the one axial end of the tubular structure 14. This makes it easy for the droplets of the lubricating oil to move along the outer peripheral surface 12a of the shaft structure 12 and fall from the portion of the shaft structure 12 that protrudes out of the one axial end of the tubular structure 14.

In top view, the end surface of the one axial end of the tubular structure 14 forms an angle with the end surface 12c of the shaft structure 12, and the lowermost points 12d and 14c of the shaft structure 12 and the tubular structure 14 are located in a plane including the end surface 14b of the tubular structure 14. In this configuration, the lubricating oil droplets formed in the lubricator 3 can be easily gathered to the lowermost points 12d and 14c of the shaft structure 12 and the tubular structure 14 and applied to the speed change structure 4 from the lowermost points 12d and 14c.

The shaft structure 12 is shaped as a tube in which the end surface 12c located towards the one axial end of the tubular structure 14 is closed, and includes the hollow interior 12b into which a gas flows from outside the housing 5. Thus, the outer peripheral surface 12a of the shaft structure 12 can be cooled with the gas to prevent evaporation of the lubricating oil in the gap G. This can prevent the gap G from being clogged with components of the lubricating oil (caulking). As such, the lubricator 3 can be used stably over a long period of time. Additionally, the lubricating oil mist collected by the lubricator 3 is cooled on the outer peripheral surface 12a of the shaft structure 12, and formation of the lubricating oil droplets is facilitated.

Since the shaft structure 12 is shaped as a tube in which the end surface 12c of the one axial end of the shaft structure 12 is closed, the gas flowing in the hollow interior 12b does not contact with air present in the internal space S. This can prevent leakage of the lubricating oil mist from the internal space S to the outside of the housing 5 or contamination of the internal space S of the housing 5 by foreign matter contained in the gas flowing in the hollow interior 12b.

The shaft structure 12 and the tubular structure 14 of the first embodiment are non-magnetic. Thus, for example, in the case where magnetic matter such as gear abrasion powder is mixed in with the lubricating oil, the lubricator 3 can be prevented from adsorbing and being soiled with the magnetic matter and can be used stably. Since both the shaft structure 12 and tubular structure 14 are non-magnetic, soiling of the lubricator 3 with magnetic matter can be reliably prevented in the case where the magnetic matter is mixed in with the lubricating oil present in the housing 5.

Figure 5:
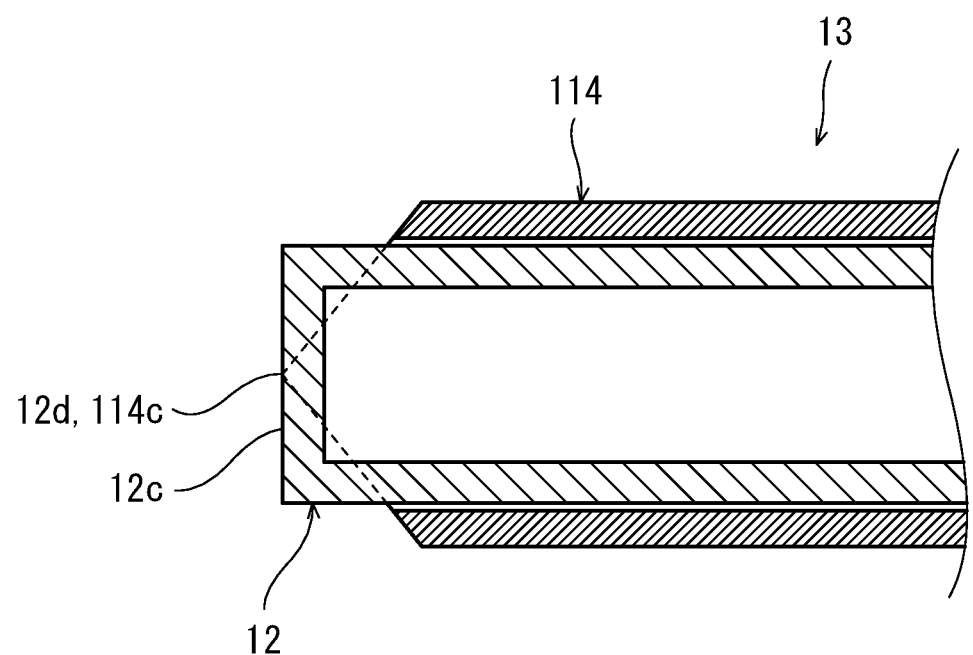
FIG. 5 shows a lubricator according to a first variant of the first embodiment and is a cross-sectional view of the lubricator as viewed in the vertical direction.

FIG. 5 shows a lubricator 13 according to a first variant of the first embodiment and is a cross-sectional view of the lubricator 13 as viewed in the vertical direction. As shown in FIG. 5, the lubricator 13 is shaped such that one axial end of a tubular structure 114 as viewed in the vertical direction is sharpened in a direction from the axial center of the tubular structure 114 towards the lowermost point 12$d$ of the shaft structure 12. Additionally, the end surface 12$c$ of the shaft structure 12 as viewed in the vertical direction is located in the same plane as a lowermost point 114$c$ of the tubular structure 114. The lubricator 13 configured as described above offers the same advantages as the lubricator 3. Additionally, it is expected that the lubricating oil droplets gathered to the lowermost points 12$d$ and 114$c$ of the shaft structure 12 and the tubular structure 114 are less likely to adhere to the tubular structure 114 and can easily fall from the lowermost points 12$d$ and 114$c$ of the shaft structure 12 and the tubular structure 114. The end surface 12$c$ of the shaft structure 12 may be located closer to the axial center of the tubular structure 114 than the lowermost point 114$c$ of the tubular structure 114.

Figure 6:
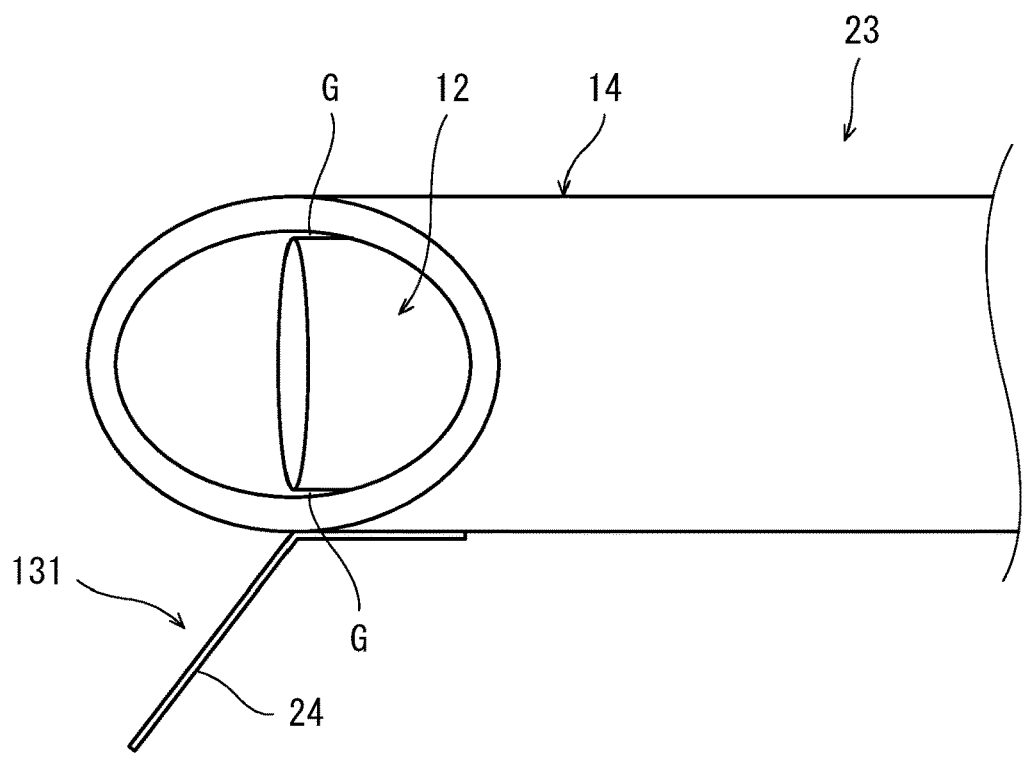
FIG. 6 is a side view of a lubricator according to a second variant of the first embodiment.

FIG. 6 is a side view of a lubricator 23 according to a second variant of the first embodiment. As shown in FIG. 6, a dropper 131 of the lubricator 23 includes a guide 24 by which the lubricating oil droplets formed in the gap G are guided to fall to a target site of the speed change structure 4. The guide 24 is a strip-shaped metal structure in this variant. The guide 24 may be another kind of structure. The lubricator 23 can apply the droplets of the lubricating oil to the target site of the speed change structure 4 using the guide 24 even in the case where, for example, there is a limitation to the location of the shaft structure 12 and tubular structure 14. Hereinafter, a second embodiment will be described with emphasis on differences from the first embodiment.

Second Embodiment

Figure 7:
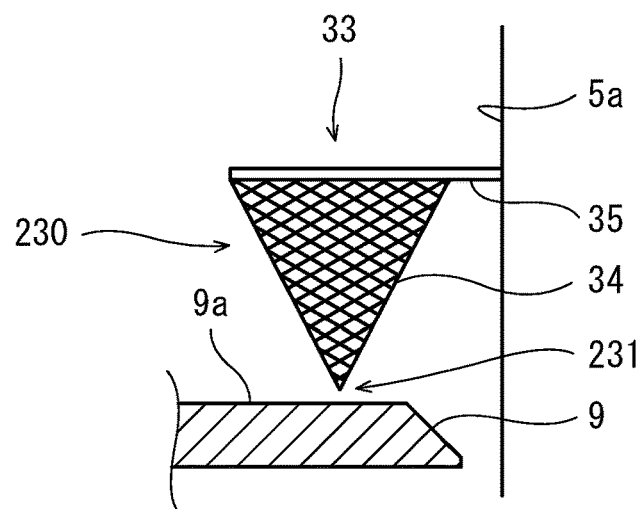
FIG. 7 is a side view of a lubricator according to a second embodiment.

FIG. 7 is a side view of a lubricator 33 according to the second embodiment. As shown in FIG. 7, the lubricator 33 includes a mesh structure 34 disposed to contact the lubricating oil mist floating in the internal space S and a bracket 35 supporting the mesh structure 34 and mounted on the inner wall 5$a$ of the housing 5. The mesh structure 34 is in the shape of, for example, a circular cone having a lower end as its apex, but is not limited to being in this shape. The number and size of the openings of the mesh structure 34 are defined such that the mesh structure 34 can collect the lubricating oil mist floating in the internal space S and form droplets of the lubricating oil. In the second embodiment, a collector 230 includes a mesh portion of the mesh structure 34. A dropper 231 includes a lower end of the mesh structure 34.

With the use of the lubricator 33, the mist of the lubricating oil can be collected by the mesh structure 34, and droplets of the lubricating oil can be easily formed from the collected mist. A porous structure such as a sponge may be used instead of the mesh structure 34.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure. The shaft structure 12 may be in a shape other than the shape of a circular cylinder and may be, for example, in the shape of a prism. The tubular structure 14 may be in a shape other than the shape of a straight pipe and may be, for example, in the shape of a bent pipe.

The material of the shaft structure 12 of the lubricator 3, 13, or 23 may have a higher thermal conductivity than the material of the tubular structure 14. In this case, it is expected that the shaft structure 12 is efficiently cooled with the gas flowing in the hollow interior 12$b$ and that droplets of the lubricating oil can be easily formed from the mist in the gap G. Two or more lubricators 3, 13, 23, or 33 may be disposed in the housing 5. In this case, the lubricators 3, 13, 23, or 33 may be disposed at discrete locations such that the droplets of the lubricating oil are applied to different components such as different gears of the speed change structure 4.

What is claimed is:

1. A transmission lubricating assembly of a helicopter, the transmission lubricating assembly comprising:
    a transmission including a speed change structure that changes the speed of rotation produced by rotational power input from a prime mover and outputs the resulting rotational power and a housing accommodating the speed change structure; and
    a lubricator that lubricates the speed change structure, wherein
    the lubricator includes a collector that collects a mist of a lubricating oil in an internal space of the housing and a dropper that is disposed below the collector and that applies droplets of the lubricating oil to the speed change structure, the droplets resulting from the collected mist being gathered under its own weight; wherein the lubricator includes a shaft structure extending in a horizontal direction and a tubular structure disposed to enclose an outer peripheral surface of the shaft structure, with a gap defined between an inner peripheral surface of the tubular structure and the outer peripheral surface of the shaft structure, one axial end of the tubular structure is located below the other axial end of the tubular structure, the collector includes the outer peripheral surface of the shaft structure, an end surface of the shaft structure, and the inner peripheral surface of the tubular structure, the end surface of the shaft structure being located towards the one axial end of the tubular structure, the droplets of the lubricating oil are retained in the gap, and the dropper includes a lowermost point of a region of the shaft structure and a lowermost point of a region of the tubular structure, the regions facing each other across the gap.

2. The transmission lubricating assembly according to claim 1, wherein the lubricator is mounted on the housing.

3. The transmission lubricating assembly according to claim 1, wherein
    the speed change structure includes gears, and
    the lubricator applies the droplets of the lubricating oil to a toothed surface of at least one of the gears.

4. The transmission lubricating assembly according to claim 3, wherein
    the gears include a bevel gear disposed such that a toothed surface of the bevel gear faces upward, and the lubricator applies the droplets of the lubricating oil to the toothed surface of the bevel gear.

5. The transmission lubricating assembly according to claim 4, wherein the collector is disposed facing against a direction of rotation of the bevel gear when viewed in a direction of a rotation axis of the bevel gear.

6. The transmission lubricating assembly according to claim 1, wherein one axial end of the shaft structure protrudes out of the one axial end of the tubular structure.

7. The transmission lubricating assembly according to claim 6, wherein
in top view,
an end surface of the one axial end of the tubular structure forms an angle with the end surface of the shaft structure, and
the lowermost points of the shaft structure and the tubular structure are located in a plane including the end surface of the tubular structure.

8. The transmission lubricating assembly according to claim 1, wherein
the shaft structure is shaped as a tube in which the end surface located towards the one axial end of the tubular structure is closed, and
the shaft structure includes a hollow interior into which a gas flows from outside the housing.

9. The transmission lubricating assembly according to claim 1, wherein the shaft structure is non-magnetic.

10. The transmission lubricating assembly according to claim 1, wherein the tubular structure is non-magnetic.

* * * * *